US011408349B2

(12) United States Patent
Sawyers-Abbott et al.

(10) Patent No.: US 11,408,349 B2
(45) Date of Patent: Aug. 9, 2022

(54) ACTIVE FLOW CONTROL TRANSPIRATIONAL FLOW ACOUSTICALLY LINED GUIDE VANE

(71) Applicant: Raytheon Technologies Corporation, Farmington, CT (US)

(72) Inventors: Nigel David Sawyers-Abbott, South Glastonbury, CT (US); Dilip Prasad, North Granby, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 17/119,480

(22) Filed: Dec. 11, 2020

(65) Prior Publication Data

US 2022/0049656 A1    Feb. 17, 2022

Related U.S. Application Data

(60) Provisional application No. 63/065,923, filed on Aug. 14, 2020.

(51) Int. Cl.
  *F02C 7/24* (2006.01)
  *F01D 9/04* (2006.01)
  (Continued)

(52) U.S. Cl.
  CPC .............. *F02C 7/24* (2013.01); *F01D 9/041* (2013.01); *F02C 7/042* (2013.01); *F02C 7/045* (2013.01);
  (Continued)

(58) Field of Classification Search
  CPC .. F02C 7/24; F02C 7/042; F02C 7/045; F01D 9/041; F05D 2220/32; F05D 2240/12; F05D 2260/96; Y02T 50/10
  See application file for complete search history.

(56) References Cited

U.S. PATENT DOCUMENTS 3,421,577 A    1/1969   Valyi
3,735,593 A    5/1973   Howell
(Continued)

FOREIGN PATENT DOCUMENTS

DE    102010023703 A1    12/2011
EP    1998028 A2    12/2008
(Continued)

OTHER PUBLICATIONS

Extended European Search Report for EP Application No. 21191481.7, dated Feb. 9, 2022, 8 pages.
(Continued)

*Primary Examiner* — Igor Kershteyn
*Assistant Examiner* — Brian Christopher Delrue
(74) *Attorney, Agent, or Firm* — Kinney & Lange, P.A.

(57) ABSTRACT

A vane for use in a gas turbine engine includes an airfoil having a suction side and a pressure side, and a transpirational flow acoustic liner disposed in the airfoil. The liner includes a face sheet defining a portion of an outer surface of the airfoil and having a plurality of first apertures, a segmented member coupled to the face sheet, and a backing sheet coupled to the segmented member the segmented member such that the segmented member is positioned between the face sheet and the backing sheet. The segmented member includes a plurality of chambers in fluid communication with the outer surface via the plurality of first apertures. The backing sheet has a plurality of second apertures.

13 Claims, 3 Drawing Sheets

(51) Int. Cl.
*F02C 7/045* (2006.01)
*F02C 7/042* (2006.01)

(52) U.S. Cl.
CPC ...... *F05D 2220/32* (2013.01); *F05D 2240/12* (2013.01); *F05D 2260/96* (2013.01); *Y02T 50/10* (2013.01)

(56) References Cited

U.S. PATENT DOCUMENTS

| | | | |
|---|---|---|---|
| 3,820,628 A * | 6/1974 | Hanson | F02C 7/24 181/214 |
| 4,255,083 A * | 3/1981 | Andre | G10K 11/1785 415/119 |
| 4,749,150 A * | 6/1988 | Rose | B64D 33/02 244/53 B |
| 5,782,077 A * | 7/1998 | Porte | F02C 7/185 60/782 |
| 6,004,095 A | 12/1999 | Waitz et al. | |
| 6,152,685 A | 11/2000 | Hagi | |
| 7,018,172 B2 | 3/2006 | Prasad et al. | |
| 7,077,623 B2 | 7/2006 | Guemmer | |
| 7,200,999 B2 * | 4/2007 | Bagnall | F04D 29/526 60/785 |
| 7,334,998 B2 | 2/2008 | Jones et al. | |
| 7,540,354 B2 * | 6/2009 | Morin | G10K 11/172 181/292 |
| 7,607,287 B2 | 10/2009 | Reba et al. | |
| 8,579,225 B2 * | 11/2013 | Mardjono | F02C 7/24 244/1 N |
| 9,103,216 B2 | 8/2015 | Kennepohl et al. | |
| 9,574,452 B2 | 2/2017 | Rose et al. | |
| 10,066,548 B2 | 9/2018 | Gilson et al. | |
| 10,107,191 B2 * | 10/2018 | Gilson | F01D 9/041 |
| 10,113,559 B2 | 10/2018 | Turner et al. | |
| 10,655,538 B2 | 5/2020 | Gilson et al. | |
| 10,914,188 B2 | 2/2021 | Ekra Devalere et al. | |
| 11,028,722 B2 | 6/2021 | Freeman et al. | |
| 11,047,258 B2 | 6/2021 | Whittle et al. | |
| 11,203,949 B2 | 12/2021 | Brinson et al. | |
| 11,242,766 B2 | 2/2022 | Boudsocq | |
| 2004/0081552 A1 | 4/2004 | Guemmer | |
| 2005/0135924 A1 | 6/2005 | Prasad et al. | |
| 2008/0295518 A1 | 12/2008 | Reba et al. | |
| 2013/0195610 A1 | 8/2013 | Rose et al. | |
| 2017/0081020 A1 * | 3/2017 | Pujar | B64D 33/02 |
| 2018/0320541 A1 | 11/2018 | Zelesky et al. | |
| 2019/0136708 A1 | 5/2019 | Sebastian et al. | |
| 2020/0103139 A1 | 4/2020 | Schiller et al. | |
| 2020/0386107 A1 * | 12/2020 | Hoisington | F02K 3/06 |

FOREIGN PATENT DOCUMENTS

| | | | |
|---|---|---|---|
| GB | 1085227 A | | 9/1967 |
| GB | 2361035 A | | 10/2001 |
| GB | 2471845 A * | 1/2011 | ............... F02K 3/06 |
| GB | 2471845 A | | 1/2011 |
| WO | WO2005100753 A1 | | 10/2005 |

OTHER PUBLICATIONS

Extended European Search Report for EP Application No. 21213880.4, dated Apr. 22, 2022, 8 pages.

* cited by examiner

ACTIVE FLOW CONTROL TRANSPIRATIONAL FLOW ACOUSTICALLY LINED GUIDE VANE

CROSS-REFERENCE TO RELATED APPLICATION(S)

This application claims the benefit of U.S. Provisional Application No. 63/065,923, filed Aug. 14, 2020 for "ACTIVE FLOW CONTROL TRANSPIRATIONAL FLOW ACOUSTICALLY LINED GUIDE VANE" by N. D. Sawyers-Abbott and D. Prasad.

BACKGROUND

The present application relates generally to noise attenuation in geared turbofan engines and more specifically to noise reduction features provided on guide vanes.

Aft fan noise is the dominant source of noise in geared turbofan engines and acoustic liners provided in the nacelle and engine are the primary means for reducing aft fan noise. Acoustic liners provided in the engine itself are becoming more important as nacelles become shorter relative to fan diameter with the development of turbofans having increased engine bypass ratios. The addition of acoustic liners to fan exit guide vanes in the fan case can increase the acoustically treated area in the engine.

SUMMARY

In one aspect, a vane for use in a gas turbine engine includes an airfoil having a suction side and a pressure side, and a transpirational flow acoustic liner disposed in the airfoil. The liner includes a face sheet defining a portion of an outer surface of the airfoil and having a plurality of first apertures, a segmented member coupled to the face sheet, and a backing sheet coupled to the segmented member the segmented member such that the segmented member is positioned between the face sheet and the backing sheet. The segmented member includes a plurality of chambers in fluid communication with the outer surface via the plurality of first apertures. The backing sheet has a plurality of second apertures.

In another aspect, a transpirational flow acoustic liner assembly for a gas turbine engine includes a guide vane assembly including an airfoil having a suction side and a pressure side, and a transpirational flow acoustic liner disposed in the airfoil. The liner includes a face sheet defining a portion of an outer surface of the airfoil and having a plurality of first apertures, a segmented member coupled to the face sheet, a backing sheet coupled to the segmented member the segmented member such that the segmented member is positioned between the face sheet and the backing sheet, and a suction chamber coupled to the backing sheet opposite the segmented member. The segmented member includes a plurality of chambers in fluid communication with the outer surface via the plurality of first apertures. The backing sheet has a plurality of second apertures.

In yet another aspect, a method for providing acoustic attenuation on a guide vane in a fan section of a gas turbine engine of an aircraft includes drawing airflow through the guide vane and establishing suction on an outer surface of the acoustic liner.

The present summary is provided only by way of example, and not limitation. Other aspects of the present disclosure will be appreciated in view of the entirety of the present disclosure, including the entire text, claims, and accompanying figures.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

An active flow control transpirational flow acoustically lined guide vane can improve aft fan noise attenuation. In the disclosed transpirational flow acoustic liner, airflow can be drawn into and pumped through the vane. Suction created on the acoustic liner flow surface can reduce drag on the guide vane by retaining laminar flow across the rougher acoustic liner surface of the vane. Biased flow, which refers to a mean flow through the liner, can additionally be modulated to control the acoustic impedance of the liner and thereby improve sound absorption performance. Airflow pumped through the vane can be exhausted to an outer surface of a nacelle at a location forward of the fan to additionally help retain laminar flow on the outer nacelle surface for a longer distance and thereby reduce external drag.

Figure 1:
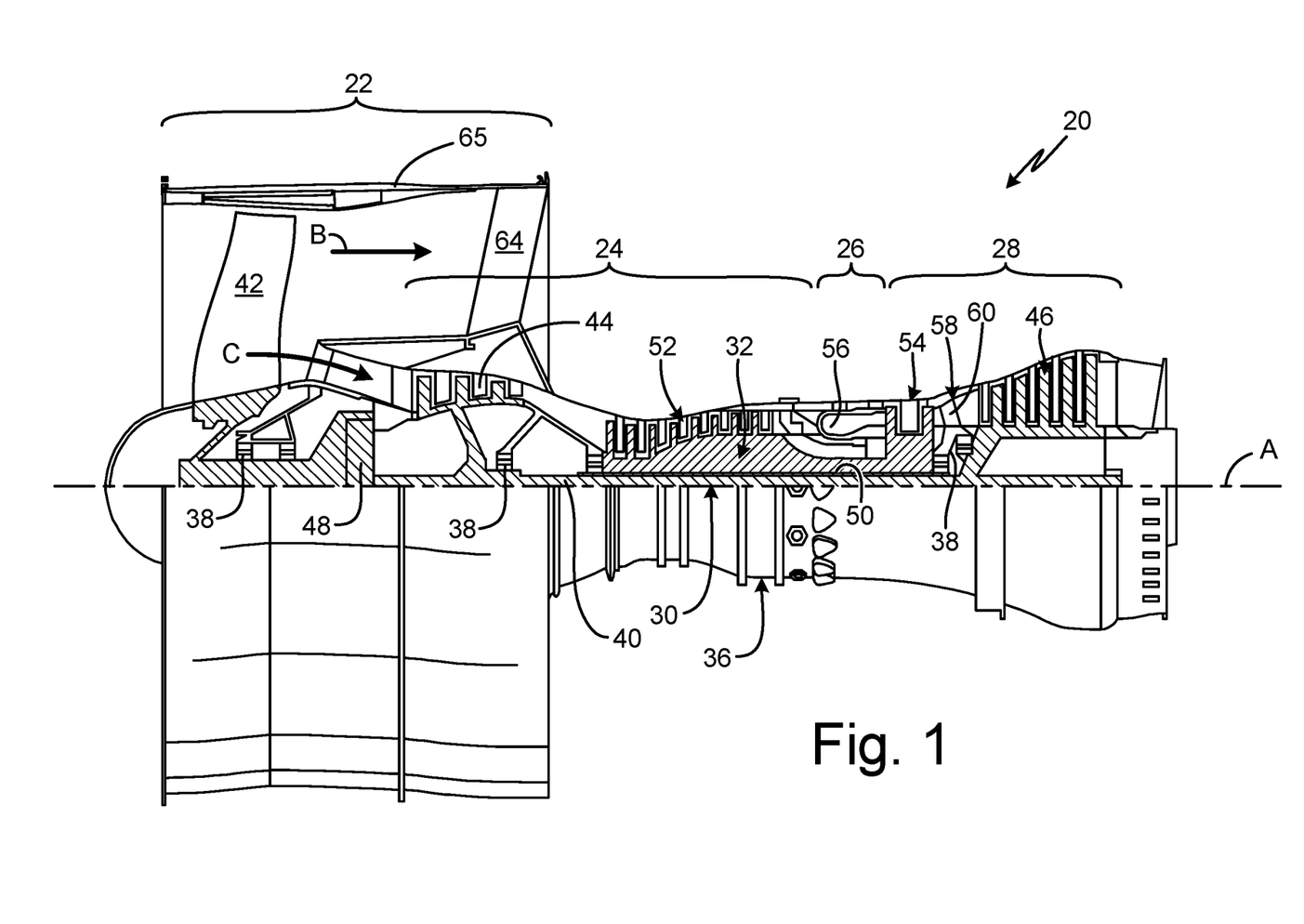
FIG. 1 is a quarter-sectional view of a gas turbine engine.

FIG. 1 is a quarter-sectional view of a gas turbine engine 20 that includes fan section 22, compressor section 24, combustor section 26 and turbine section 28. Fan section 22 drives air along bypass flow path B while compressor section 24 draws air in along core flow path C where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24.

Although the disclosed non-limiting embodiment depicts a turbofan gas turbine engine, it should be understood that the concepts described herein are not limited to use with turbofans as the teachings may be applied to other types of turbine engines; for example a low-bypass turbine engine, or a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes low speed spool 30 and high speed spool 32 mounted for rotation about an engine central longitudinal axis A relative to an engine static structure 36 via several bearing systems 38. It should be understood that various bearing systems 38 at various locations may alternatively or additionally be provided.

Low speed spool 30 generally includes inner shaft 40 that connects fan 42 and low pressure compressor section 44 to low pressure turbine section 46. Inner shaft 40 drives fan 42 through a speed change device, such as geared architecture 48, to drive fan 42 at a lower speed than low speed spool 30. High-speed spool 32 includes outer shaft 50 that interconnects high pressure compressor section 52 and high pressure turbine section 54. Inner shaft 40 and outer shaft 50 are concentric and rotate via bearing systems 38 about engine central longitudinal axis A.

Combustor 56 is arranged between high pressure compressor 52 and high pressure turbine 54. In one example, high pressure turbine 54 includes at least two stages to provide a double stage high pressure turbine 54. In another example, high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of low pressure turbine 46 as related to the pressure measured at the outlet of low pressure turbine 46 prior to an exhaust nozzle.

Mid-turbine frame 58 of engine static structure 36 is arranged generally between high pressure turbine 54 and low pressure turbine 46. Mid-turbine frame 58 further supports bearing systems 38 in turbine section 28 as well as setting airflow entering low pressure turbine 46.

The core airflow C is compressed by low pressure compressor 44 then by high pressure compressor 52, mixed with fuel, and ignited in combustor 56 to produce high speed exhaust gases that are then expanded through high pressure turbine 54 and low pressure turbine 46. Mid-turbine frame 57 includes airfoils/vanes 60, which are in the core airflow path and function as an inlet guide vane for low pressure turbine 46. Utilizing vanes 60 of mid-turbine frame 58 as inlet guide vanes for low pressure turbine 46 decreases the length of low pressure turbine 46 without increasing the axial length of mid-turbine frame 58. Reducing or eliminating the number of vanes in low pressure turbine 46 shortens the axial length of turbine section 28. Thus, the compactness of gas turbine engine 20 is increased and a higher power density may be achieved.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a fan exit guide vane 64 system. The low fan pressure ratio as disclosed herein according to one non-limiting embodiment is less than about 1.45. "Low corrected fan tip speed" is the actual fan tip speed in ft/sec divided by an industry standard temperature correction of $[(Tambient\ deg\ R)/518.7)^\wedge 0.5]$. The "Low corrected fan tip speed" as disclosed herein according to one non-limiting embodiment is less than about 1150 ft/second.

Figure 2:
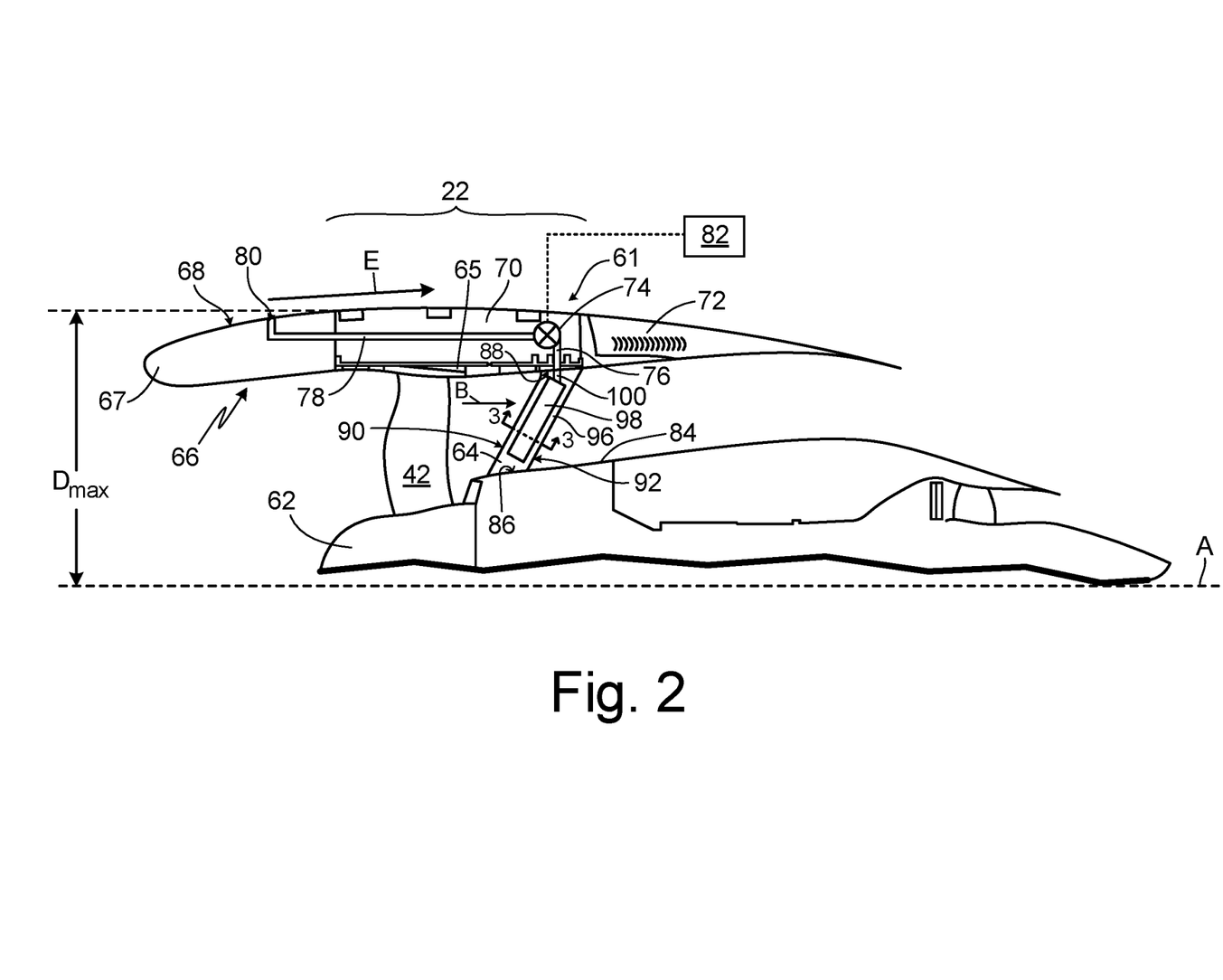
FIG. 2 is a simplified cross-sectional view of a transpirational acoustic liner assembly in a fan section of a gas turbine engine.

FIG. 2 illustrates transpirational flow acoustic liner assembly 61 in a fan section of a gas turbine engine. FIG. 2 shows fan section 22 with fan blade 42, fan rotor 62, and fan exit guide vane 64, and fan case 65; nacelle 66 having inlet cowl 67 with outer surface 68, fan cowl door 70, thrust reverser 72, pump 74 (shown schematically), suction passage 76, exhaust duct 78, and exhaust outlet 80; controller 82; and core housing 84. Nacelle 66, including inlet cowl 67, fan cowl door 70, and thrust reverser 72 forms a shroud around the engine. Fan case 65 is spaced radially outwardly of fan blade 42. Fan cowl door 70 forms a portion of nacelle 66 positioned around fan case 65 and creating a cavity therebetween. Thrust reverser 72 forms a portion of nacelle 66 aft of fan cowl door 70. Pump 74 can be housed within nacelle 66 in the cavity formed between fan case 65 and fan cowl door 70. An inlet of pump 74 is fluidly connected to suction passage 76. An outlet of pump 74 is fluidly connected to exhaust duct 78. Suction passage 76 and exhaust duct 78 are provided in nacelle 66. Suction passage 76 can extend through fan case 65 into the cavity between fan case 65 and fan cowl door 70 to an inlet of pump 74. Suction passage 76 can connect to exit guide vane 64. Exhaust duct 78 can be disposed within the cavity formed between fan case 65 and fan cowl door 70 and can extend from an outlet of pump 74 into a cavity in inlet cowl 67. Exhaust duct 78 can extend to a location forward of the maximum nacelle diameter, Dmax, which is typically in the fan cowl door 70 section. Exhaust outlet 80 can be located on outer surface 68 of nacelle 66 and, specifically, an outer surface of inlet cowl 67. Exit guide vane 64 is positioned aft fan blade 42 and is secured to fan case 65.

Exit guide vane 64 includes an airfoil having base 86 (radially innermost end), tip 88 (radially outermost end), leading edge 90, trailing edge 92, pressure side 94 (shown in FIG. 3), suction side 96, transpirational flow acoustic liner 98, and channel 100. Exit guide vane 64 extends between core housing 84 and fan case 65 with base 86 fixed to core housing 84 and tip 88 fixed to fan case 65. Exit guide vane 64 is one of multiple circumferentially spaced guide vanes. Exit guide vanes 64 remove the swirl imparted to the bypass flow by fan blades 42 and straighten or redirect flow in a substantially axial direction. As illustrated in FIG. 2, leading edge 90 can be swept rearwardly over a full radial extent of the bypass duct from base 86 to tip 88 to reduce noise. The arrangement and number of guide vanes 64 can be optimized to improve noise attenuation as taught in U.S. Pat. No. 10,107,191.

Channel 100 at tip 88 of exit guide vane 64 can be fluidly connected to suction passage 76 of fan case 65. Transpirational flow acoustic liner 98 is open to an outer surface of guide vane 64 and channel 100 such that suction passage 76 is fluidly connected to the bypass duct and bypass flow B. Acoustic liner 98 can extend a substantially full length of guide vane 64 from base 86 to tip 88 to provide maximum acoustic benefit, or can extend a maximum length that can be accommodated by guide vane 64 without compromising structural integrity.

Pump 74 can be configured to draw a portion of bypass flow B into exit guide vane 64 through acoustic liner 98 and exhaust the air flow through exhaust duct 78 and outlet 80 to outer surface 68 of nacelle 66. Pump 74 can be any type of pump known in the art capable of moving an air flow and sized to fit in the cavity of nacelle 66 formed between fan case 65 and fan cowl door 70. Pump 74 can be secured to fan case 65 by attachment mechanisms known in the art. In some embodiments, pump 74 can be located in other locations of nacelle 66, including but not limited to a nacelle pylon (not shown) or a cavity of inlet cowl 67. In some embodiments, a single pump 74 can provide suction for a plurality of guide vanes 64 with suction passage 76 in fluid communication with each of guide vanes 64 having transpirational flow acoustic liner 98. In alternative embodiments, multiple pumps 74 can be disposed in nacelle 66. In some embodiments, assemblies can be segmented to split flow between multiple pumps, such that one pump 74 provides suction for one group of exit guide vanes 64 having transpirational flow acoustic liners 98 and another pump 74 provides suction for a separate group of exit guide vanes 64 having transpirational flow acoustic liners 98. The biased flow through exit guide vane 64 creates a lower pressure section in exit guide vane 64 to create suction on an outer flow surface of exit guide vane 64. Providing suction on the outer flow surface of exit guide vane 64 helps prevent separation of flow and helps retain a laminar flow over the acoustic liner surface, which has increased surface roughness in comparison to the remainder of the outer surface of exit guide vane 64. Biased flow through acoustic liner 98 thereby reduces drag on exit guide vane 64, which can lead to improved TSFC. Additional acoustic benefit can be gained with biased flow through acoustic liner 98. Biased flow can provide enhanced acoustic dissipation.

Controller 82 can be used to modulate flow through acoustic liner 98. By changing flow through acoustic liner 98, controller 82 can regulate the acoustic impedance and aerodynamic performance of acoustic liner 98 to match operating conditions. The acoustic impedance is directly related to ability of the acoustic liner to absorb sound. Controller 82 can be configured to allow for automatic or manual increase or decrease of a pump speed or shutoff to adjust or tune flow through acoustic liner 98 based on flight phase. Additionally, active tuning or shutoff of flow through acoustic liner 98 can be provided at given engine settings to optimize the effect on TSFC.

Active tuning can include, for example, increasing pump speed and flow through acoustic liner 98 at takeoff when the need for acoustic attenuation is greatest. At cruise conditions, the need for acoustic attenuation is reduced and flow through acoustic liner 98 can be modulated to optimize fluid flow along an outer surface of guide vane 64 and along outer surface 68 of nacelle 66 to reduce drag and improve TSFC.

Air flow from pump 74 can be channeled through exhaust duct 78 and exhausted through outlet 80 on outer surface 68 of inlet cowl 67 to promote or retain a laminar flow over a larger distance of outer surface 68. Exhaust outlet 80 can be positioned downstream of a nacelle lip (forward edge of inlet cowl 67) at a location where a boundary layer flow begins to transition from laminar to turbulent flow on the outer surface 68 and upstream of fan engine Dmax. Exhaust outlet 80 can be annular or arc-shaped, disposed around a full or partial circumference, respectively, of outer surface 68 of inlet cowl 67. In some embodiments, exhaust outlet 80 can include a plurality of openings disposed about the circumference of inlet cowl 67. In some embodiments, exhaust of air flow can be limited to outer surface 68 on an upper or top side of inlet cowl 67 where increased flow efficiency can provide increased benefit. Depending on the amount of air flow drawn through transpirational flow acoustic liner 98 and exiting outlet 80, laminar flow of exhaust flow E may be achieved on outer surface 68 across fan cowl door 70 to Dmax typically located somewhere on the fan cowl door 70 as indicated by the exhaust flow E arrow point. Laminar flow across outer surface 68 can reduce drag and thereby further improve fuel burn. In some high bypass ratio engines, the fan diameter may be too large in relationship to the volume of air drawn through transpirational flow acoustic liner assembly 61 to achieve a benefit from exhausting air flow over outer surface 68. In such embodiments, exhaust flow E may be released through other locations of nacelle 66.

Figure 3:
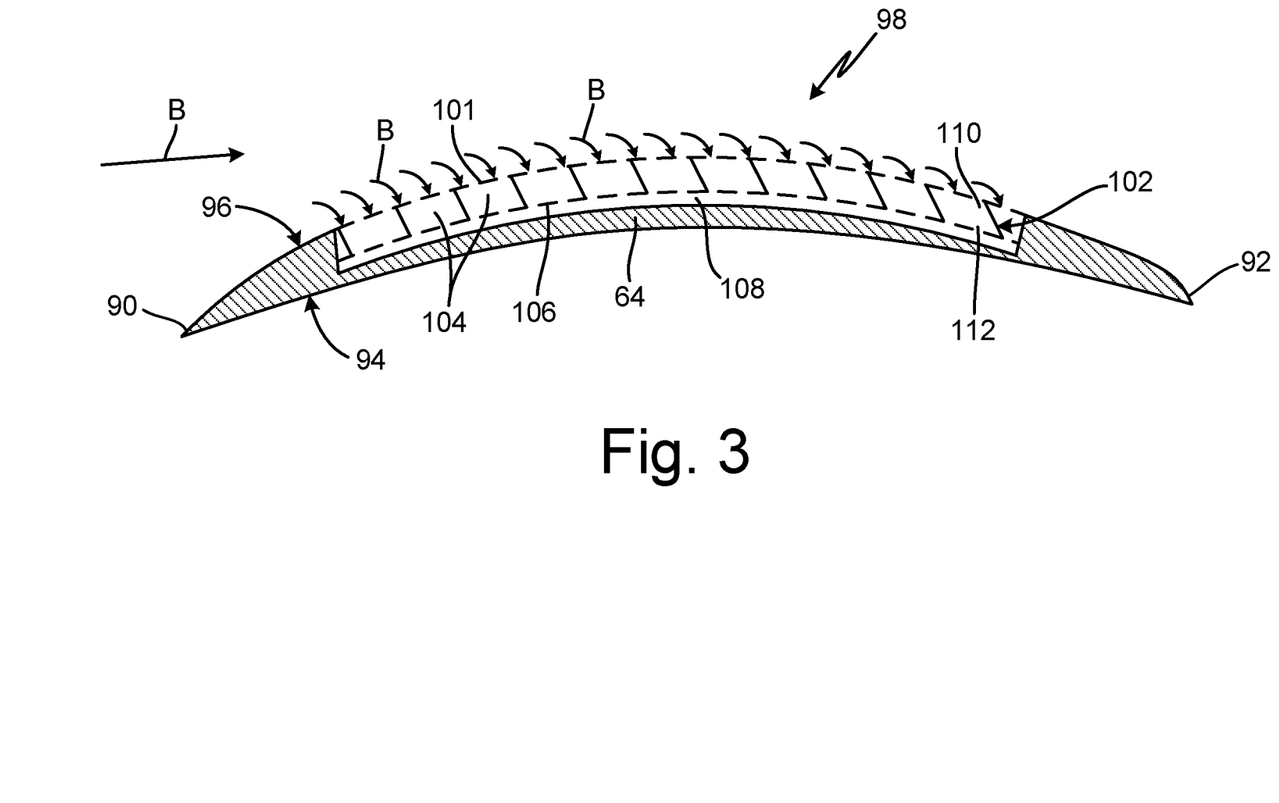
FIG. 3 is a cross-sectional view of a fan exit guide vane with a transpirational flow acoustic liner taken along the 3-3 line of FIG. 2.

FIG. 3 illustrates a cross-sectional view of fan exit guide vane 64 with transpirational flow acoustic liner 98 taken along the 3-3 line of FIG. 2. FIG. 3 shows leading edge 90, trailing edge 92, pressure side surface 94, suction side surface 96, and acoustic liner 98. Acoustic liner 98 includes perforated face sheet 101, segmented member 102 with chambers 104, perforated backing sheet 106, and suction chamber 108. Acoustic liner 98 can be a cartridge-type member that can be inserted into a pocket of guide vane 64 or can be integrally formed with guide vane 64. Acoustic liner 98 can be formed via an additive manufacturing process such as powder bed metallurgy, direct metal laser sintering, select laser sintering, select laser melting, electron beam melting or other. Acoustic liner 98 can be disposed on suction side 96 such that perforated face sheet 101 forms a portion of the suction side outer surface. Most flow separation and losses occur on the low pressure or suction side of the airfoil. As such, greater benefit may be achieved by improving flow efficiency on suction side 96. In alternative embodiments, acoustic liner 98 can be provided on both suction side 96 and pressure side 94 or pressure side 94, alone.

Perforated face sheet 101 can define a portion of the outer surface of guide vane 64. Segmented member 102 can be coupled to a back side of perforated face sheet 101. Perforated backing sheet 106 can be coupled to segmented member 102 such that segmented member 102 is positioned between perforated face sheet 101 and perforated backing sheet 106. Suction chamber 108 can be coupled to perforated backing sheet 106 opposite segmented member 102. As arranged, suction chamber 108 is in fluid communication with the outer surface of guide vane 64 via openings in perforated backing sheet 106, chambers 104 in segmented member 102, and openings in perforated face sheet 101, such that bypass flow B can enter exit guide vane 64 through perforated face sheet 101 and can flow through segmented member 102 and perforated backing sheet 106 to suction chamber 108. Suction chamber 108 is connected to or forms channel 100 open to tip 88, which connects to suction passage 76 and the inlet of pump 74.

Perforated face sheet 101 includes a plurality of apertures 110 configured to allow bypass flow B into guide vane 64 and communicate acoustic energy to underlying chambers 104 of segmented member 102. Apertures 110 can be round holes having a diameter in the range of 3 to 50 thousandths of an inch and can cover at least 5% of the surface of face sheet 101. Apertures 110 can be configured to create suction along the outer surface of guide vane 64 to prevent boundary layer flow separation, promote laminar flow, and reduce skin friction losses across exit guide vane 64 in the bypass duct aft of fan 22. Apertures 110 can be arranged in rows or patterns with substantially uniform spacing between apertures 110. The number, size, and arrangement of apertures 110 can be designed to maximize acoustic attenuation performance while optimizing suction along the outer surface of exit guide vane 64 to enhance flow and minimize drag. Apertures 110 can be sized to limit clogging. In alternative embodiments, apertures 110 can have other shapes and configurations designed to optimize flow along the outer surface of exit guide vane 64 and/or optimize acoustic attenuation. Perforated face sheet 101 can be configured to provide a substantially smooth surface with suction side 96 of exit guide vane 64. Perforated face sheet 101 can be constructed of metal, composites, and/or other known materials.

Segmented member 102 is a cellular structure such as a honeycomb structure as known in the art with open chambers 104. Segmented member 102 is disposed on the back side of perforated face sheet 101 such that perforated face sheet 101 covers chambers 104 and apertures 110 are open to chambers 104. Segmented member 102 can be designed to provide structural support. The size of chambers 104 can be optimized for providing structural support and for receiving acoustic energy. Segmented member 102 can be constructed of metal, composites, and/or other known materials. In some embodiments, acoustic liner 98 can be a double degree of freedom (DDOF) liner (not shown) in which segmented member 102 includes two cellular structure layers separated by a perforated sheet allowing air flow between the cellular structures. DDOF liners can provide additional acoustic attenuation benefit over a single row of honeycomb resonators. The first and second cellular structure layers can be tuned to different tones to achieve improved acoustic attenuation.

Perforated backing sheet 106 is disposed on a back side of segmented member 102 such that segmented member 102 is sandwiched between perforated face sheet 101 and perforated backing sheet 106. Perforated backing sheet 106 provides structural support for segmented member 102 and allows bypass flow B to be drawn through acoustic liner 98. Perforated backing sheet 106 is arranged to cover chambers 104 on the back side of segmented member. Perforated backing sheet 106 includes a plurality of apertures 112 configured to allow bypass flow B into suction chamber 108. Apertures 112 are open to chambers 104 and communicate bypass flow B from chambers 104 in segmented member 102 to suction chamber 108. Apertures 112 can be round holes having a diameter in the range of 3 to 100 thousandths of an inch and can cover at least 5% of the surface of perforated backing sheet 106. Apertures 112 can be configured to provide optimal flow dynamics through acoustic liner 98. Apertures 112 can be arranged in rows or patterns with substantially uniform spacing between apertures 112. The number, size, and arrangement of apertures 112 can be designed to optimize fluid flow through acoustic liner 98. In alternative embodiments, apertures 112 can have other shapes and configurations designed to optimize fluid flow. Perforated backing sheet 106 can be constructed of metal, composites, and/or other known materials.

Suction chamber 108 is disposed on a back side of perforated backing sheet 106. Suction chamber 108 can be an enclosure connected to perforated backing sheet 106 or can be a gap formed between perforated backing sheet 106 and an interior surface of guide vane 64 upon assembly. Suction chamber 108 can be closed at a radially inner end of acoustic liner 98 near base 86 and can be open at a radially outer end of acoustic liner 98 near tip 88 where suction chamber 108 forms or connects to channel 100 to allow bypass flow B to be drawn through acoustic liner 98 into suction passage 76 in nacelle 66. Suction chamber 108 can be sized to provide effective fluid flow through acoustic liner 98.

A transpirational flow acoustic liner 98 can be included in every fan exit guide vane 64 to maximize the size of the acoustically treated area within the engine. In alternative embodiments, acoustic liners 98 can be incorporated in less than all of exit guide vanes 64. For example, a transpirational flow acoustic liner 98 can be provided in every other exit guide vane 64 such that approximately half of the exit guide vanes 64 have acoustic liners 98 and approximately half of exit guide vanes 64 do not have acoustic liners 98. The number and arrangement of exit guide vanes 64 with acoustic liners 98 can be designed to optimize noise attenuation.

In some embodiments, acoustic attenuation properties of acoustic liner 98 can be optimized as described in U.S. Pat. No. 7,540,354, "Micro-perforated Acoustic Liner," and U.S. Pat. No. 10,107,191, "Geared Gas Turbine Engine with Reduced Fan Noise," which are incorporated by reference.

During operation of transpirational flow acoustic liner assembly 61, bypass flow B is drawn into exit guide vane 64 aft of fan 22, thereby establishing suction on an outer surface of face sheet 101 of acoustic liner 98. Suction is created by drawing bypass flow B through acoustic liner 98 into suction chamber 108 and suction passage 76 of nacelle 66. Pump 74 draws bypass flow B from an opening in tip 88 of exit guide vane 64 through fan case 65 via suction passage 76 to an inlet of pump 74 located in the cavity between fan case 65 and fan cowl door 70. Pump 74 exhausts bypass flow B received from exit guide vane 64 through duct 78 and outlet 80 along an outer surface of inlet cowl 67 at a location forward of exit guide vane 64 (exhaust flow E). Generally, outlet 80 for exhaust flow E can be positioned at a location aft of the nacelle lip and forward of fan cowl door 70 or near a location where boundary layer air flow begins separate from outer surface 68 of inlet cowl 67. In some embodiments, exhaust flow E can be provided only on an upper surface (with respect to the ground during flight) of inlet cowl 67. Controller 82 can be used to regulate flow through transpirational flow acoustic liner 98 during operation of the gas turbine engine by turning on/off or modulating the speed of pump 74. For example, pump speed can be increased at takeoff when aft fan noise is most significant to improve acoustic attenuation. At cruise, pump speed may be reduced as the focus shifts from noise attenuation to improving engine efficiency, which includes reducing drag.

The disclosed active flow control transpirational flow acoustic liner assembly can reduce drag on exit guide vanes 64 and outer surface 68 of inlet cowl 67 by promoting laminar flow and thereby improve fuel burn. Modulation of flow through transpirational acoustic liner 98 can be used to optimize acoustic impedance and match operating conditions. Improved noise attenuation can allow for reductions in fan duct length, which can enable installation of larger bypass ratio engine systems.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Discussion of Possible Embodiments

The following are non-exclusive descriptions of possible embodiments of the present invention.

A vane for use in a gas turbine engine according to one embodiment of the present application includes an airfoil having a suction side and a pressure side, and a transpirational flow acoustic liner disposed in the airfoil. The liner includes a face sheet defining a portion of an outer surface of the airfoil and having a plurality of first apertures, a segmented member coupled to the face sheet, and a backing sheet coupled to the segmented member the segmented member such that the segmented member is positioned between the face sheet and the backing sheet. The segmented member includes a plurality of chambers in fluid communication with the outer surface via the plurality of first apertures. The backing sheet has a plurality of second apertures.

The vane of the preceding paragraph can optionally include, additionally and/or alternatively, any one or more of the following features, configurations and/or additional components:

The vane of the preceding paragraphs can further include a suction chamber coupled to the backing sheet opposite the segmented member, wherein the suction chamber is in fluid communication with the outer surface via the plurality of second apertures, the plurality of chambers, the plurality of first apertures.

The vane of any of the preceding paragraphs, wherein first apertures of the plurality of first apertures have a diameter in a range of 3 to 50 thousandths of an inch.

The vane of any of the preceding paragraphs, wherein the second apertures of the plurality of second apertures have a diameter in the range of 3 to 100 thousandths of an inch.

The vane of any of the preceding paragraphs, wherein the suction chamber is open at a tip end of the vane.

The vane of any of the preceding paragraphs, wherein the liner face sheet is located on a suction side of the airfoil.

A transpirational flow acoustic liner assembly for a gas turbine engine includes a guide vane assembly including an airfoil having a suction side and a pressure side, and a transpirational flow acoustic liner disposed in the airfoil. The liner includes a face sheet defining a portion of an outer surface of the airfoil and having a plurality of first apertures, a segmented member coupled to the face sheet, a backing sheet coupled to the segmented member the segmented member such that the segmented member is positioned between the face sheet and the backing sheet, and a suction chamber coupled to the backing sheet opposite the segmented member. The segmented member includes a plurality of chambers in fluid communication with the outer surface via the plurality of first apertures. The backing sheet has a plurality of second apertures.

The transpirational flow acoustic liner of the preceding paragraph can optionally include, additionally and/or alternatively, any one or more of the following features, configurations and/or additional components:

The transpirational flow acoustic liner of the preceding paragraphs can further include a pump configured to draw an airflow from the outer surface, through the backing sheet, into the suction chamber, and out of the guide vane.

The transpirational flow acoustic liner of an of the preceding paragraphs, wherein the guide vane is coupled to a fan case of the gas turbine engine at a radially outer end and wherein the suction chamber is fluidly connected to a flow passage extending through the fan case.

The transpirational flow acoustic liner of an of the preceding paragraphs, wherein the pump is positioned within a cavity of a nacelle of the gas turbine engine.

The transpirational flow acoustic liner of an of the preceding paragraphs can further include an exhaust duct fluidly connected to the pump.

The transpirational flow acoustic liner of an of the preceding paragraphs, wherein the exhaust duct opens to a radially outer surface of the at a location forward of the guide vane and is configured to direct flow along the outer surface of the nacelle.

The transpirational flow acoustic liner of an of the preceding paragraphs can further include a controller in communication with the pump and configured to modulate and airflow through the guide vane and exit duct.

A method for providing acoustic attenuation on a guide vane in a fan section of a gas turbine engine of an aircraft includes drawing airflow through the guide vane and establishing suction on an outer surface of the acoustic liner.

The method of the preceding paragraph can optionally include, additionally and/or alternatively, any one or more of the following features, configurations, additional components, and/or steps:

The method of the preceding paragraphs, wherein suction is established by drawing airflow through the acoustic liner and into a suction chamber of the guide vane.

The method of any of the preceding paragraphs can further include drawing the airflow from a tip end of the guide vane into a nacelle cavity.

The method of any of the preceding paragraphs can further include exhausting the airflow from the guide vane along an outer surface of the nacelle from a position forward of the guide vane.

The method of any of the preceding paragraphs, wherein the airflow is drawn through the guide vane with a pump positioned within the nacelle.

The method of any of the preceding paragraphs can further include increasing a pump speed and airflow through the acoustic liner at flight takeoff.

The method of any of the preceding paragraphs can further include decreasing a pump speed and airflow through the acoustic liner at a cruse condition of flight.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A vane assembly for use in a gas turbine engine, the vane assembly comprising:
   a guide vane having an airfoil having a suction side and a pressure side and extending from a base to a tip; and
   a transpirational flow acoustic liner disposed in the airfoil, the liner comprising:
   a face sheet defining a portion of an outer surface of at least one of the pressure side and the suction side of the airfoil extending between the base and the tip, the face sheet having a plurality of first apertures;
   a segmented member coupled to the face sheet, the segmented member comprising a plurality of chambers in fluid communication with the outer surface via the plurality of first apertures;
   a backing sheet coupled to the segmented member such that the segmented member is positioned between the face sheet and the backing sheet, the backing sheet having a plurality of second apertures;
   a suction chamber coupled to the backing sheet opposite the segmented member, the suction chamber in fluid communication with the outer surface via the plurality of second apertures, the plurality of chambers, and the plurality of first apertures, wherein the suction chamber is open at the tip of the vane; and
   an exhaust duct open to a radially outer surface of a nacelle at a location forward of the guide vane, the exhaust duct being configured to direct flow along the radially outer surface of the nacelle.

2. The vane assembly of claim 1, wherein first apertures of the plurality of first apertures have a diameter in a range of 3 to 50 thousandths of an inch.

3. The vane assembly of claim 1, wherein the second apertures of the plurality of second apertures have a diameter in the range of 3 to 100 thousandths of an inch.

4. The vane assembly of claim 1, wherein the liner face sheet is located on a suction side of the airfoil.

5. A transpirational flow acoustic liner assembly for a gas turbine engine, the assembly comprising:
   a guide vane assembly comprising:
   an airfoil having a suction side and a pressure side and extending from a base to a tip; and
   a transpirational flow acoustic liner disposed in the airfoil, the liner comprising:
   a face sheet defining a portion of an outer surface of at least one of the pressure side and the suction side of the airfoil extending between the base and the tip, the face sheet having a plurality of first apertures;
   a segmented member coupled to the face sheet, the segmented member comprising a plurality of chambers in fluid communication with the outer surface via the plurality of first apertures;
   a backing sheet coupled to the segmented member such that the segmented member is positioned between the face sheet and the backing sheet, the backing sheet having a plurality of second apertures; and
   a suction chamber coupled to the backing sheet opposite the segmented member;
   a pump configured to draw an airflow from the outer surface, through the backing sheet, into the suction chamber, and out of the guide vane;
   an exhaust duct fluidly connected to the pump;
   wherein the guide vane is coupled to a fan case of the gas turbine engine at a radially outer end and wherein the suction chamber is fluidly connected to a flow passage extending through the fan case;
   wherein the pump is positioned within a cavity of a nacelle of the gas turbine engine; and
   wherein the exhaust duct opens to a radially outer surface of the nacelle at a location forward of the guide vane and is configured to direct flow along the radially outer surface of the nacelle.

6. The assembly of claim 5, and further comprising a controller in communication with the pump and configured to modulate and airflow through the guide vane and exit duct.

7. A method for providing acoustic attenuation on a guide vane in a fan section of a gas turbine engine of an aircraft, the method comprising:
   drawing airflow through an acoustic liner disposed in the guide vane;
   establishing suction on an outer surface of the acoustic liner;
   exhausting the airflow from the guide vane along a radially outer surface of the nacelle from a position forward of the guide vane; and
   directing the airflow along the radially outer surface of the nacelle.

8. The method of claim 7, wherein suction is established by drawing airflow through the acoustic liner and into a suction chamber of the guide vane.

9. The method of claim 8, and further comprising drawing the airflow from a tip end of the guide vane into a nacelle cavity.

10. The method of claim 9, wherein the airflow is drawn through the guide vane with a pump positioned within the nacelle.

11. The method of claim 10, and further comprising increasing a pump speed and airflow through the acoustic liner at flight takeoff.

12. The method of claim 10, and further comprising decreasing a pump speed and airflow through the acoustic liner at a cruse condition of flight.

13. The method of claim 7, wherein the outer surface of the acoustic liner forms an outer surface of at least one of a pressure side and a suction side of the guide vane, the outer surface of the acoustic liner extending radially between a base and a tip of the guide vane.

* * * * *